US011543689B2

(12) United States Patent
Honda et al.

(10) Patent No.: US 11,543,689 B2
(45) Date of Patent: Jan. 3, 2023

(54) LIQUID CRYSTAL DISPLAY DEVICE

(71) Applicant: Shanghai Tianma Micro-Electronics Co., Ltd., Shanghai (CN)

(72) Inventors: Tomomi Honda, Kanagawa (JP); Hidenori Ikeno, Kanagawa (JP); Mitsuhiro Sugimoto, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/739,666

(22) Filed: May 9, 2022

(65) Prior Publication Data

US 2022/0382086 A1  Dec. 1, 2022

(30) Foreign Application Priority Data

May 27, 2021 (JP) .............................. JP2021-089503

(51) Int. Cl.
*G09G 3/36* (2006.01)
*G02F 1/133* (2006.01)
*G02F 1/1347* (2006.01)
*G02F 1/1343* (2006.01)

(52) U.S. Cl.
CPC ........ *G02F 1/13306* (2013.01); *G02F 1/1347* (2013.01); *G02F 1/134363* (2013.01); *G09G 3/3607* (2013.01); *G09G 2300/023* (2013.01); *G09G 2320/0252* (2013.01); *G09G 2320/0673* (2013.01); *G09G 2360/16* (2013.01); *G09G 2380/10* (2013.01)

(58) Field of Classification Search
None
See application file for complete search history.

(56) References Cited

U.S. PATENT DOCUMENTS

2009/0051707 A1    2/2009  Hirata et al.
2017/0053610 A1*   2/2017  Yang .................... G09G 3/3611

FOREIGN PATENT DOCUMENTS

| JP | 4-248517 A    | 9/1992 |
| JP | 2003-015146 A | 1/2003 |
| JP | 2008-020712 A | 1/2008 |
| JP | 2008-122536 A | 5/2008 |
| WO | 2007/040139 A1 | 4/2007 |

* cited by examiner

Primary Examiner — Chad M Dicke
(74) Attorney, Agent, or Firm — Sughrue Mion, PLLC

(57) ABSTRACT

A liquid crystal display device includes a first liquid crystal display panel that displays a color image, a second liquid crystal display panel that displays a monochrome image, and a display controller that controls the display of the first liquid crystal display panel and the display of the second liquid crystal display panel. The display controller switches the display of the second liquid crystal display panel between a monochrome display that displays a monochrome image and an all-white display. In a state in which the display of the second liquid crystal display panel is the monochrome display, when a response time between predetermined gradations is greater than or equal to a predetermined first response time, the display controller switches the display of the second liquid crystal display panel from the monochrome display to the all-white display.

7 Claims, 6 Drawing Sheets

LIQUID CRYSTAL DISPLAY DEVICE

CROSS-REFERENCE TO RELATED APPLICATION

This application claims the benefit of Japanese Patent Application No. 2021-89503, filed on May 27, 2021, the entire disclosure of which is incorporated by reference herein.

FIELD

The present disclosure relates generally to a liquid crystal display device.

BACKGROUND

In the related art, liquid crystal display devices are known in which a plurality of liquid crystal display panels are stacked to improve contrast ratio. For example, International Publication No. WO2007/040139 describes a liquid crystal display device including a color liquid crystal panel positioned on an observer side and a black and white liquid crystal panel positioned on a side, opposite the surface of the observer side, of the color liquid crystal panel.

With the liquid crystal display device of International Publication No. WO2007/040139, the transmittance is the product of the transmittances of the various liquid crystal display panels and, as such, the transmittance of the liquid crystal display device decreases. However, using negative liquid crystal in a horizontal electric field type liquid crystal display panel is known as a method for improving the transmittance of the liquid crystal display panel. Unexamined Japanese Patent Application Publication No. 2003-15146 discloses that rises of liquid crystal molecules can be suppressed and decreases in the maximum transmittance can be suppressed by using negative liquid crystal in a horizontal electric field type liquid crystal display panel.

The transmittance of a liquid crystal display device improves when applying the horizontal electric field type liquid crystal display panel that uses negative liquid crystal of Unexamined Japanese Patent Application Publication No. 2003-15146 to the liquid crystal display device of International Publication No. WO2007/040139. However, typically, the response time of a liquid crystal display panel that uses negative liquid crystal is longer than the response time of a liquid crystal display panel that uses positive liquid crystal and, as such, deteriorations (display blurring, image tailing, and the like) in display quality are more likely to occur, particularly at low temperatures at which the response time is longer.

SUMMARY

A liquid crystal display device of the present disclosure includes:
a first liquid crystal display panel that displays a color image;
a second liquid crystal display panel that is positioned on a side, opposite a surface of an observer side, of the first liquid crystal display panel so as to overlap the first liquid crystal display panel, and that displays a monochrome image; and
a display controller that controls a display of the first liquid crystal display panel and a display of the second liquid crystal display panel, and that switches the display of the second liquid crystal display panel between a monochrome display that displays the monochrome image and an all-white display, wherein
a response time of the second liquid crystal display panel is longer than a response time of the first liquid crystal display panel, and
in a state in which the display of the second liquid crystal display panel is the monochrome display, when a response time between predetermined gradations is greater than or equal to a predetermined first response time, the display controller switches the display of the second liquid crystal display panel from the monochrome display to the all-white display.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a liquid crystal display device according to various embodiments is described while referencing the drawings.

Embodiment 1

A liquid crystal display device 10 according to the present embodiment is described while referencing FIGS. 1 to 6. The liquid crystal display device 10 displays a color image by a hereinafter described first liquid crystal display panel 100 that displays a color image and a second liquid crystal display panel 200 that displays a monochrome image.

Figure 1:
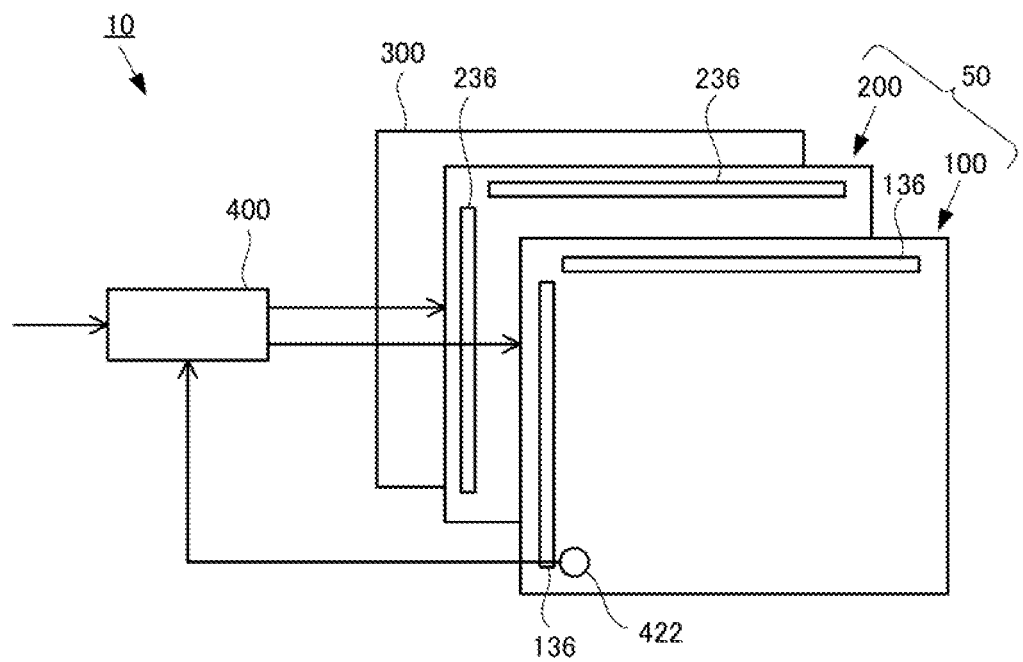
FIG. 1 is a schematic drawing illustrating a liquid crystal display device according to Embodiment 1.

As illustrated in FIG. 1, the liquid crystal display device 10 includes a panel section 50, a back light 300, and a display controller 400. The panel section 50 includes the first liquid crystal display panel 100 and the second liquid crystal display panel 200. The first liquid crystal display panel 100 displays a color image. The second liquid crystal display panel 200 displays a monochrome image. The back light 300 is a light source that emits light on the first liquid crystal display panel 100 and the second liquid crystal display panel 200. The display controller 400 controls the displays of the first liquid crystal display panel 100 and the second liquid crystal display panel 200. Furthermore, the display controller 400 switches the display of the second liquid crystal display panel 200 between a monochrome display and an all-white display. Herein, the term "monochrome display" refers to a display of a monochrome image, and the term "all-white display" refers to a display in which the transmittance of all of the main pixels is maximized.

Panel Section

The panel section 50 includes the first liquid crystal display panel 100 and the second liquid crystal display panel 200. The first liquid crystal display panel 100 is positioned on an observer side and displays a color image. The second liquid crystal display panel 200 is positioned on a side, opposite the surface of the observer side, of the first liquid crystal display panel 100 (a back surface side of the first liquid crystal display panel 100), and overlaps the first liquid crystal display panel 100. The second liquid crystal display panel 200 displays a monochrome image.

First Liquid Crystal Display Panel

The first liquid crystal display panel 100 is implemented as a transmissive horizontal electric field type liquid crystal display panel that uses positive liquid crystal. The first liquid crystal display panel 100 is active matrix driven by thin film transistors (TFT).

The first liquid crystal display panel 100 includes main pixels arranged in a matrix. The main pixels are formed from a red pixel that emits red light, a green pixel that emits green light, and a blue pixel that emits blue light (all not illustrated in the drawings). Note that, in the following, the red pixel, the green pixel, and the blue pixel, are sometimes referred to collectively as sub pixels.

Figure 2:
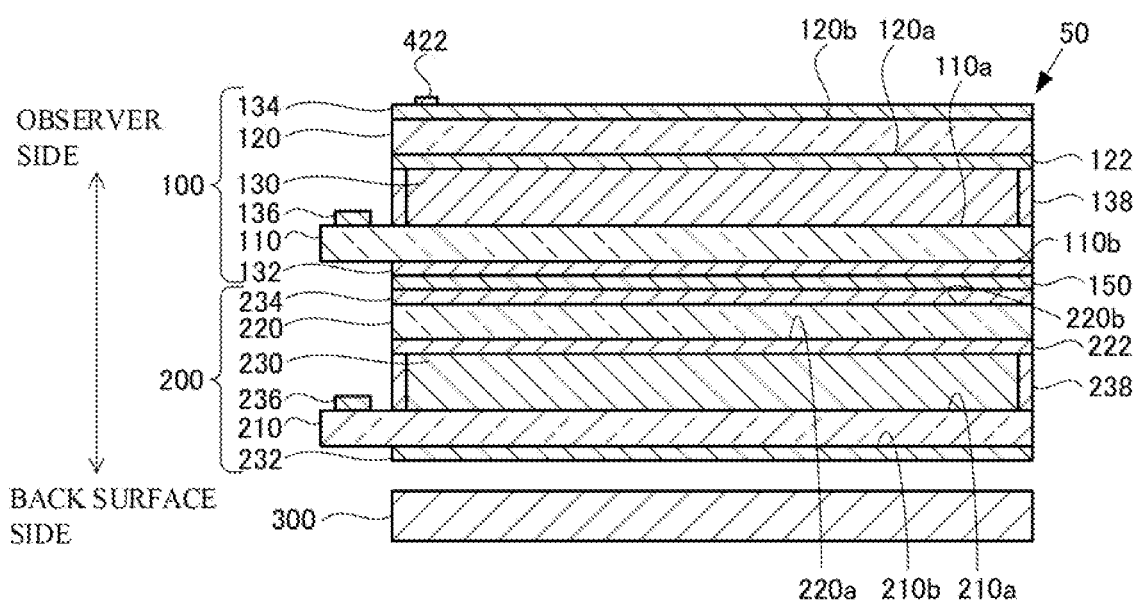
FIG. 2 is a schematic drawing illustrating a cross-section of a first liquid crystal display panel, a second liquid crystal display panel, and a back light according to Embodiment 1.

As illustrated in FIG. 2, the first liquid crystal display panel 100 includes a first TFT substrate 110, a first counter substrate 120, a first liquid crystal 130, a first polarizing plate 132, a second polarizing plate 134, and a first driver circuit 136. The first TFT substrate 110 and the first counter substrate 120 sandwich the first liquid crystal 130. The first polarizing plate 132 is provided on the first TFT substrate 110. The second polarizing plate 134 is provided on the first counter substrate 120.

In one example, the first TFT substrate 110 is implemented as a glass substrate. TFTs for selecting sub pixels, a pair of electrodes for applying voltage to the first liquid crystal 130, an alignment film for aligning the first liquid crystal 130, and the like are provided on a main surface 110a on the first liquid crystal 130 side of the first TFT substrate 110 (all not illustrated in the drawings).

Furthermore, a plurality of common lines, a plurality of signal lines, and a plurality of scan lines are formed on the main surface 110a of the first TFT substrate 110 (all not illustrated in the drawings). The common lines supply common potential to one of the electrodes that applies voltage to the first liquid crystal 130. The signal lines supply, via the TFT, voltage to the other electrode that applies voltage to the first liquid crystal 130. The scan lines supply voltage for operating the TFTs. The sub pixels are surrounded by the signal lines and the scan lines, and the TFTs are provided at the intersections between the scan lines and the signal lines.

The first polarizing plate 132 is provided on a main surface 110b of the first TFT substrate 110, on the side opposite the main surface 110a.

The first counter substrate 120 faces the first TFT substrate 110 and is adhered to the first TFT substrate 110 by a seal material 138. In one example, the first counter substrate 120 is implemented as a glass substrate. A color filter layer 122, an alignment film that aligns the first liquid crystal 130, and the like are provided on a main surface 120a on the first liquid crystal 130 side of the first counter substrate 120. In one example, the color filter layer 122 is implemented as a stripe-like color filter. Each of a red color filter, a green color filter, and a blue color filter of the color filter layer 122 is surrounded by a black matrix that blocks light, and corresponds to each of the red pixel, the green pixel, and the blue pixel.

The second polarizing plate 134 is provided on a main surface 120b of the first counter substrate 120, on the side opposite the main surface 120a.

The first liquid crystal 130 is sandwiched between the first TFT substrate 110 and the first counter substrate 120. The first liquid crystal 130 is implemented as a positive-type nematic liquid crystal. The first liquid crystal 130 is aligned, by the alignment film, in a direction parallel to the main surface 110a of the first TFT substrate 110. Additionally, the first liquid crystal 130 rotates in a plane parallel to the main surface 110a of the first TFT substrate 110 due to the voltage applied from the electrodes.

The first polarizing plate 132 is provided on the main surface 110b of the first TFT substrate 110. The second polarizing plate 134 is provided on the main surface 120b of the first counter substrate 120. The transmittance axis of the first polarizing plate 132 and the transmittance axis of the second polarizing plate 134 are arranged parallel to an alignment direction of the first liquid crystal 130. The first polarizing plate 132 is adhered to a fourth polarizing plate 234 (described later) of the second liquid crystal display panel 200 by an adhesive layer 150.

The first driver circuit 136 is provided on the main surface 110a of the first TFT substrate 110. The first driver circuit 136 supplies, on the basis of a color image signal supplied from the display controller 400, voltage to the scan lines, the signal lines, and the common lines.

Second Liquid Crystal Display Panel

As illustrated in FIG. 2, the second liquid crystal display panel 200 is positioned on the back surface side of the first liquid crystal display panel 100. The second liquid crystal display panel 200 is adhered to the first liquid crystal display panel 100 by the adhesive layer 150. The second liquid crystal display panel 200 displays a monochrome image. The response time of the second liquid crystal display panel 200 is longer than the response time of the first liquid crystal display panel 100. Herein, the phrase "the response time is long" means that, when comparing response times between the same gradations, the response time between any of the gradations is long.

In the present embodiment, the second liquid crystal display panel 200 is implemented as a transmissive horizontal electric field type liquid crystal display panel that uses negative liquid crystal. The second liquid crystal display panel 200 is active matrix driven by TFTs. The second liquid crystal display panel 200 includes main pixels arranged in a matrix. The main pixels of the second liquid crystal display panel 200 correspond to the main pixels of the first liquid crystal display panel 100, and the main pixels of the liquid crystal display device 10 are formed from the main pixels of the first liquid crystal display panel 100 and the main pixels of the second liquid crystal display panel 200.

Figure 3:
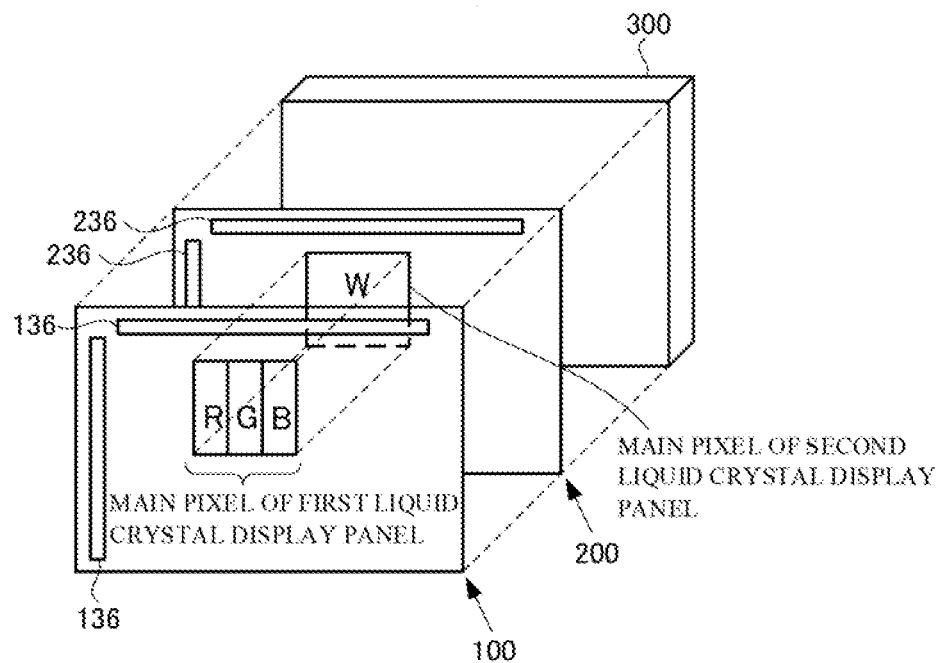
FIG. 3 is a schematic drawing illustrating an example of the correspondence between main pixels of the first liquid crystal display panel and main pixels of the second liquid crystal display panel.
Figure 4:
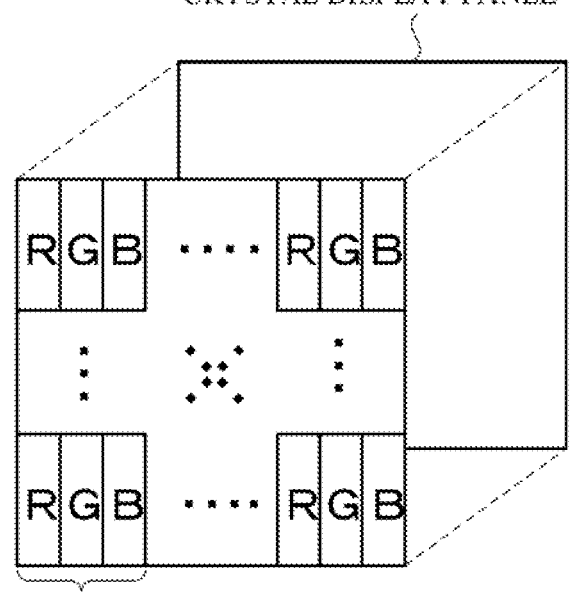
FIG. 4 is a schematic drawing illustrating an example of the correspondence between the main pixels of the first liquid crystal display panel and the main pixels of the second liquid crystal display panel.

More specifically, as illustrated in FIGS. 3 and 4, one main pixel of the second liquid crystal display panel 200 corresponds to at least one main pixel of the first liquid crystal display panel 100. Note that FIG. 3 illustrates a configuration in which the main pixels of the second liquid crystal display panel 200 correspond to the main pixels of the first liquid crystal display panel 100 on a one-to-one basis. FIG. 4 illustrates a configuration in which one main pixel of the second liquid crystal display panel 200 corresponds to a plurality of main pixels of the first liquid crystal display panel 100.

The second liquid crystal display panel 200 includes a second TFT substrate 210, a second counter substrate 220, a second liquid crystal 230, a third polarizing plate 232, a fourth polarizing plate 234, and a second driver circuit 236. The second TFT substrate 210 and the second counter substrate 220 sandwich the second liquid crystal 230. The third polarizing plate 232 is provided on the second TFT substrate 210. The fourth polarizing plate 234 is provided on the second counter substrate 220. Note that the second liquid crystal display panel 200 does not include a color filter.

In one example, the second TFT substrate 210 is implemented as a glass substrate. As on the main surface 110a of the first TFT substrate 110, TFTs for selecting main pixels, a pair of electrodes for applying voltage to the second liquid crystal 230, an alignment film for aligning the second liquid crystal 230, common lines, signal lines, scan lines, and the like are provided on a main surface 210a on the second liquid crystal 230 side of the second TFT substrate 210 The configurations of the TFTs, the pair of electrodes, the common lines, and the like are the same as the configurations of the TFTs, the pair of electrodes, the common lines, and the like of the first TFT substrate 110.

The third polarizing plate 232 is provided on a main surface 210b of the second TFT substrate 210, on the side opposite the main surface 210a.

The second counter substrate 220 faces the second TFT substrate 210 and is adhered to the second TFT substrate 210 by a seal material 238. In one example, the second counter substrate 220 is implemented as a glass substrate. A black matrix layer 222 that blocks light, an alignment film that aligns the second liquid crystal 230, and the like are provided on a main surface 210a on the second liquid crystal 230 side of the second counter substrate 220. The black matrix layer 222 is provided in a grid pattern and defines the main pixels of the second liquid crystal display panel 200.

The fourth polarizing plate 234 is provided on a main surface 220b of the second counter substrate 220, on the side opposite the main surface 220a.

The second liquid crystal 230 is sandwiched between the second TFT substrate 210 and the second counter substrate 220. The second liquid crystal 230 is implemented as a negative-type nematic liquid crystal. The second liquid crystal 230 is aligned, by the alignment film, in a direction parallel to the main surface 210a of the second TFT substrate 210. Additionally, the second liquid crystal 230 rotates in a plane parallel to the main surface 210a of the second TFT substrate 210 due to the voltage applied from the electrodes.

The third polarizing plate 232 is provided on the main surface 210b of the second TFT substrate 210. The fourth polarizing plate 234 is provided on the main surface 220b of the second counter substrate 220. The transmittance axis of the third polarizing plate 232 and the transmittance axis of the fourth polarizing plate 234 are arranged parallel to the alignment direction of the second liquid crystal 230.

The fourth polarizing plate 234 is adhered to the first polarizing plate 132 of the first liquid crystal display panel 100 by the adhesive layer 150. The transmittance axis of the fourth polarizing plate 234 and the transmittance axis of the first polarizing plate 132 are arranged in parallel.

The second driver circuit 236 is provided on the main surface 210a of the second TFT substrate 210. The second driver circuit 236 supplies, on the basis of a signal supplied from the display controller 400, voltage to the scan lines, the signal lines, and the common lines.

Back Light

As illustrated in FIG. 2, the back light 300 is arranged on the back surface side of the second liquid crystal display panel 200. In one example, the back light 300 is implemented as a direct back light. The back light 300 includes a white light emitting diode (LED), a reflective sheet, a diffusion sheet, and the like (all not illustrated in the drawings).

Display Controller

The display controller 400 controls the displays of the first liquid crystal display panel 100 and the second liquid crystal display panel 200. In a state in which the first liquid crystal display panel 100 displays the color image and the display of the second liquid crystal display panel 200 is the monochrome display, when a response time between predetermined gradations of the liquid crystal display device 10 is greater than or equal to a predetermined first response time T1, the display controller 400 switches the display of the second liquid crystal display panel 200 from the monochrome display to the all-white display. Additionally, in a state in which the first liquid crystal display panel 100 displays the color image and the display of the second liquid crystal display panel 200 is the all-white display, when a response time between the predetermined gradations of the liquid crystal display device 10 is less than a predetermined second response time T2, the display controller 400 switches the display of the second liquid crystal display panel 200 from the all-white display to the monochrome display.

The response time between the predetermined gradations and the first response time T1 of the liquid crystal display device 10 are set on the basis of in-vehicle standard related to display devices, the specifications of the electronic device on which the liquid crystal display device 10 is to be mounted, and the like. For example, when the in-vehicle standard related to display devices stipulates that the longest response time between gradations at −20° C. be 180 ms or less, the response time between the predetermined gradations is set to the longest response time between gradations. Additionally, the first response time T1 is set to 180 ms. In the following, the longest response time between gradations is sometimes referred to as the "maximum response time."

Furthermore, the second response time T2 of the liquid crystal display device 10 refers to the response time in a state in which the first liquid crystal display panel 100 displays the color image and the display of the second liquid crystal display panel 200 is the all-white display, in a case in which the display of the second liquid crystal display panel 200 is switched from the monochrome display to the all-white display at the first response time T1.

Figure 5:
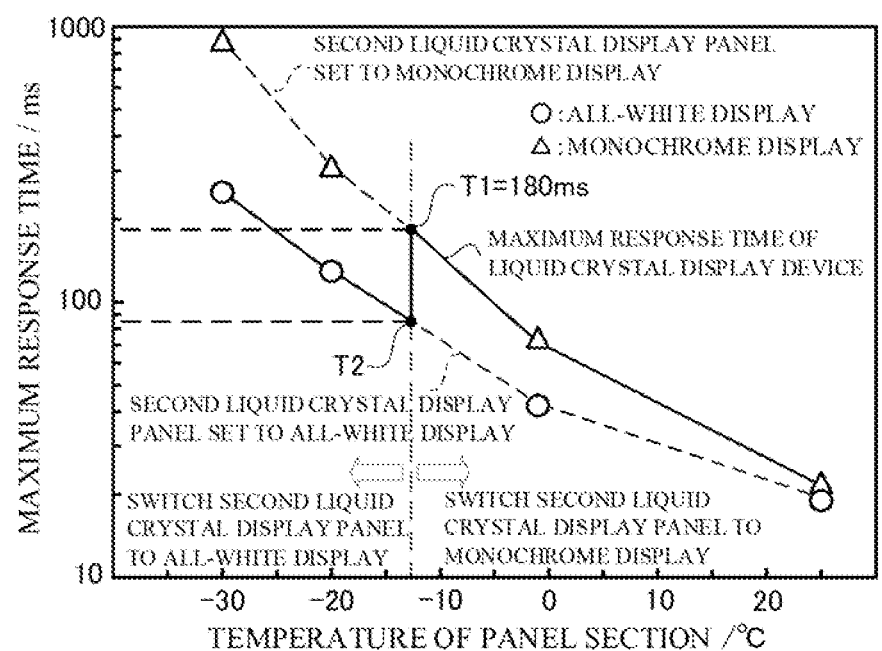
FIG. 5 is a drawing illustrating an example of the dependence on temperature of the maximum response time of the liquid crystal display device according to Embodiment 1.

FIG. 5 illustrates an example of the dependence on temperature of the maximum response time of the liquid crystal display device 10. In one example, the display controller 400 switches the second liquid crystal display panel 200 from the monochrome display to the all-white display when the temperature of the panel section 50 decreases from 25° C. due to a decrease in the ambient temperature, and the maximum response time of the liquid crystal display device 10 is greater than or equal to the first response time T1 (180 ms). Due to this configuration, the maximum response time of the liquid crystal display device 10 becomes shorter than the maximum response time in a case in which the second liquid crystal display panel 200 maintains the monochrome display, and deteriorations in display quality can be suppressed. Specifically, when a response time between the predetermined gradations of the liquid crystal display device 10 is greater than or equal to the predetermined first response time T1, the display controller 400 switches the display of the second liquid crystal display panel 200, for which the response time is long, from the monochrome display to the all-white display. As a result, even at low temperatures, it is possible to suppress the response time of the liquid crystal display device 10 from becoming longer, and deteriorations in display quality can be suppressed.

Meanwhile, the display controller 400 switches the second liquid crystal display panel 200 from the all-white display to the monochrome display when the temperature of the panel section 50 increases from the low temperature side (for example −25° C.) due to an increase in the ambient temperature, and the maximum response time of the liquid crystal display device 10 is shorter than the second response time T2 (85 ms in FIG. 3). Due to this configuration, the liquid crystal display device 10 can display color images that have higher contrast.

Figure 6:
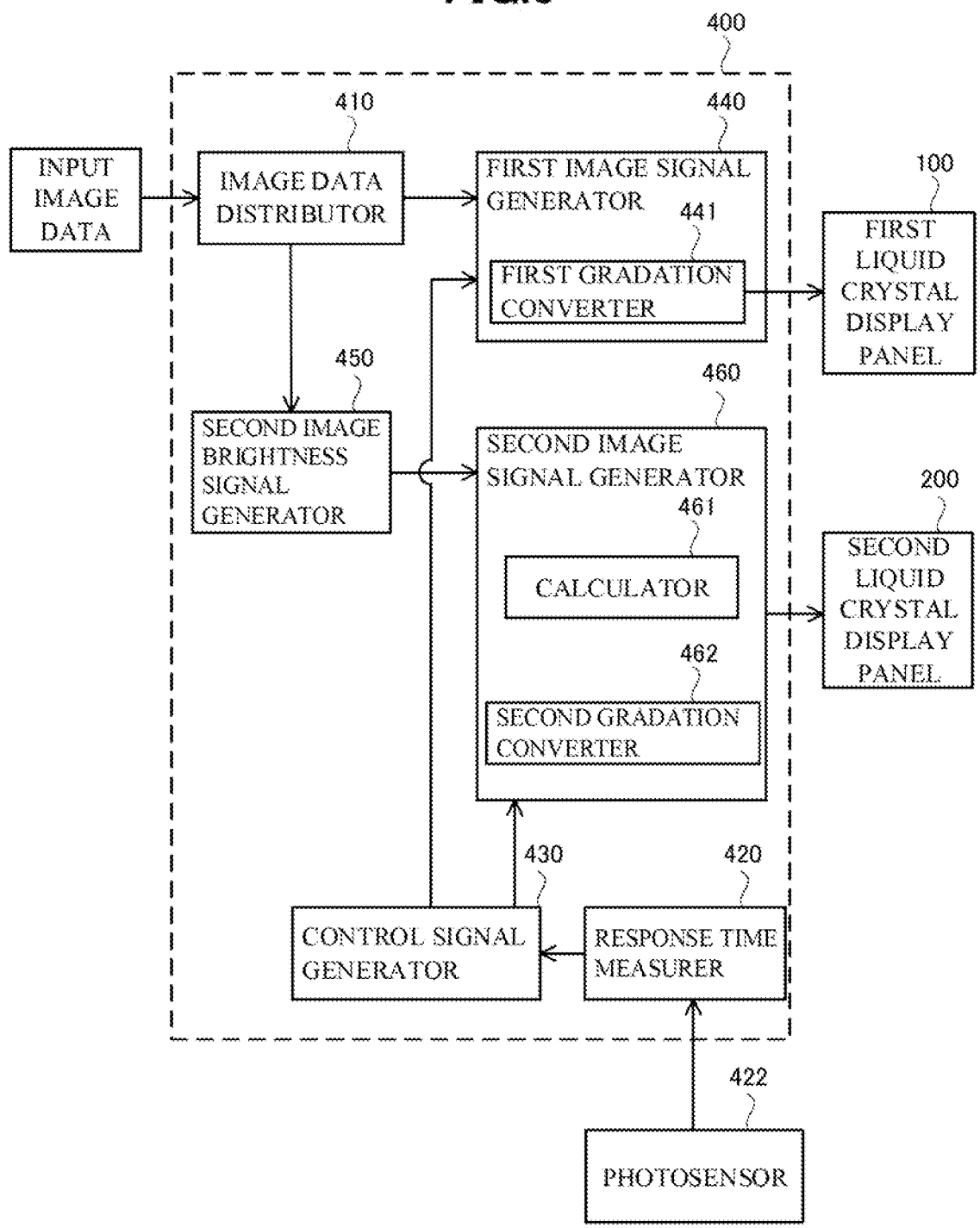
FIG. 6 is a block diagram illustrating the configuration of a display controller according to Embodiment 1.

Next, the specific configuration of the display controller 400 is described. As illustrated in FIG. 6, the display controller 400 includes an image data distributor 410, a response time measurer 420, a control signal generator 430, a first image signal generator 440, a second image brightness signal generator 450, and a second image signal generator 460. The image data distributor 410 distributes input image data to the first image signal generator 440 and the second image brightness signal generator 450. The response time measurer 420 calculates the response time between predetermined gradations of the liquid crystal display device 10. The control signal generator 430 selects the display of the second liquid crystal display panel 200, and sends a control signal expressing the selected display to the first image signal generator 440 and the second image signal generator 460.

The first image signal generator 440 includes a first gradation converter 441 and generates a color image to be displayed on the first liquid crystal display panel 100. Additionally, the first image signal generator 440 sends a color image signal expressing the generated color image to the first liquid crystal display panel 100. The second image brightness signal generator 450 generates, from the input image data, a brightness signal for generating a monochrome image to be displayed on the second liquid crystal display panel 200. The second image signal generator 460 generates, on the basis of the brightness signal sent from the second image brightness signal generator 450, the monochrome image to be displayed on the second liquid crystal display panel 200, and sends a monochrome image signal expressing the generated monochrome image to the second liquid crystal display panel 200. Additionally, the second image signal generator 460 generates a signal for setting the second liquid crystal display panel 200 to the all-white display, and sends the generated signal to the second liquid crystal display panel 200. The second image signal generator 460 includes a calculator 461 and a second gradation converter 462.

In the following, the color image signal expressing the color image to be displayed on the first liquid crystal display panel 100 is sometimes described as a "color image signal." Additionally, the monochrome image signal expressing the monochrome image to be displayed on the second liquid crystal display panel 200 is sometimes described as a "monochrome image signal", and the signal for setting the second liquid crystal display panel 200 to the all-white display is sometimes described as an "all-white display signal."

The image data distributor 410 distributes input image data, input from outside, to the first image signal generator 440 and the second image brightness signal generator 450.

The response time measurer 420 calculates the response time between predetermined gradations of the liquid crystal display device 10 from changes in a light amount of the liquid crystal display device 10 measured by a photosensor 422, and a clock number. As illustrated in FIG. 2, the photosensor 422 is provided on the second polarizing plate 134 of the first liquid crystal display panel 100. The response time measurer 420 sends a signal expressing the response time between predetermined gradations to the control signal generator 430.

The control signal generator 430 selects, on the basis of the response time between the predetermined gradations calculated by the response time measurer 420, the display of the second liquid crystal display panel 200 from among the monochrome display and the all-white display.

Specifically, in a state in which the first liquid crystal display panel 100 displays the color image and the display of the second liquid crystal display panel 200 is the monochrome display, when the response time between the predetermined gradations is greater than or equal to the predetermined first response time T1, the control signal generator 430 selects the all-white display as the display of the second liquid crystal display panel 200. As a result, the display of the second liquid crystal display panel 200 is switched from the monochrome display to the all-white display.

Meanwhile, in a state in which the first liquid crystal display panel 100 displays the color image and the display of the second liquid crystal display panel 200 is the monochrome display, when the response time between the predetermined gradations is shorter than the predetermined first response time T1, the control signal generator 430 selects the monochrome display as the display of the second liquid crystal display panel 200. As a result, the display of the second liquid crystal display panel 200 is maintained as the monochrome display.

Additionally, in a state in which the first liquid crystal display panel 100 displays the color image and the display of the second liquid crystal display panel 200 is the all-white display, when the response time between the predetermined gradations is shorter than the predetermined second response time T2, the control signal generator 430 selects the monochrome display as the display of the second liquid crystal display panel 200. As a result, the display of the second liquid crystal display panel 200 is switched from the all-white display to the monochrome display.

Meanwhile, in a state in which the first liquid crystal display panel 100 displays the color image and the display of the second liquid crystal display panel 200 is the all-white display, when the response time between the predetermined gradations is longer than the predetermined second response time T2, the control signal generator 430 selects the all-white display as the display of the second liquid crystal display panel 200. As a result, the display of the second liquid crystal display panel 200 is maintained as the all-white display.

The control signal generator 430 sends a control signal expressing the selected display to the first image signal generator 440 and the second image signal generator 460.

The first image signal generator 440 generates, from the input image data distributed by the image data distributor 410, a color image to be displayed on the first liquid crystal display panel 100. Specifically, the first gradation converter 441 of the first image signal generator 440 performs gradation conversion for converting the distributed input image data to color image data having brightness-gradation characteristics suited to the first liquid crystal display panel 100. In one example, a lookup table in which input/output relationships are preset is used in the conversion of the data.

The first image signal generator 440 sends a color image signal expressing the generated color image to the first driver circuit 136 of the first liquid crystal display panel 100.

When the control signal generator 430 selects the all-white display as the display of the second liquid crystal display panel 200, it is preferable that the first image signal generator 440 performs gamma correction on the color image signal. For example, in the state in which the first liquid crystal display panel 100 displays the color image and the display of the second liquid crystal display panel 200 is the monochrome display, when a gamma value of the liquid crystal display device 10 is set to 2.2 (the gamma value of the first liquid crystal display panel 100 is set to 1.1, and the gamma value of the second liquid crystal display panel 200 is set to 1.1), the gamma value of the liquid crystal display device 10 becomes 1.1 when the display of the second liquid crystal display panel 200 is set to the all-white display and the observer is more likely to feel uncomfortable with the display of the liquid crystal display device 10. Therefore, it is particularly preferable that the first image signal generator 440 performs gamma correction for matching gamma characteristics (first gamma characteristics) of the liquid crystal display device 10 in a state in which the display of the second liquid crystal display panel 200 is the monochrome display and gamma characteristics (second gamma characteristics) of the liquid crystal display device 10 in a state in which the display of the second liquid crystal display panel 200 is the all-white display.

The second image brightness signal generator 450 generates a brightness signal for generating a monochrome image from the input image data. As illustrated in FIGS. 3 and 4, the main pixels of the second liquid crystal display panel 200 that display the monochrome image correspond to one or more main pixels of the first liquid crystal display panel 100 that displays the color image. In other words, the total number of main pixels of the second liquid crystal display panel 200 is less than or equal to the total number of main pixels of the first liquid crystal display panel 100. Accordingly, a brightness level of one main pixel of the second liquid crystal display panel 200 must be calculated on the basis of the color image data of one or a plurality of main pixels of the first liquid crystal display panel 100 that correspond to that main pixel.

As illustrated in FIG. 3, when one main pixel of the first liquid crystal display panel 100 that displays the color image corresponds to one main pixel of the second liquid crystal display panel 200 that displays the monochrome image, the brightness level of the corresponding one main pixel of the second liquid crystal display panel 200 is calculated on the basis of the color image data of the one main pixel of the first liquid crystal display panel 100. Additionally, as another method, the brightness level of the monochrome image may be calculated with the maximum gradation value among a red gradation value, a green gradation value, and a blue gradation value of each main pixel of the input image data as the brightness level of each main pixel of the second liquid crystal display panel 200.

As illustrated in FIG. 4, when one main pixel of the second liquid crystal display panel 200 that displays the monochrome image corresponds to a plurality of main pixels of the first liquid crystal display panel 100 that displays the color image, the brightness level of the main pixel of the second liquid crystal display panel 200 is calculated from the average value, the frequency value, the minimum value, the maximum value, and the like of the red gradation value, the green gradation value, and the blue gradation value of each main pixel of the first liquid crystal display panel 100. The calculated brightness level may be a gradation value, for example.

The second image brightness signal generator 450 sends a brightness signal expressing the calculated brightness level to the second image signal generator 460.

When the control signal generator 430 selects the monochrome display as the display of the second liquid crystal display panel 200, the second image signal generator 460 generates, on the basis of the brightness signal sent from the second image brightness signal generator 450, the monochrome image to be displayed on the second liquid crystal display panel 200. Additionally, when the control signal generator 430 selects the all-white display as the display of the second liquid crystal display panel 200, the second image signal generator 460 generates a signal (all-white display signal) for setting the display of the second liquid crystal display panel 200 to the all-white display. The second image signal generator 460 sends, to the second driver circuit 236 of the second liquid crystal display panel 200, a signal expressing the monochrome image (monochrome image signal) or the all-white display signal.

The second image signal generator 460 generates a monochrome image that has been subjected to averaging processing and gradation conversion. In one example, the calculator 461 of the second image signal generator 460 uses a weighted average based on the distance from a target main pixel to average the brightness levels of the main pixels located within a predetermined distance from the target main pixel. Due to this, the second image signal generator 460 can generate a monochrome image that has blurred edges. Furthermore, the second gradation converter 462 of the second image signal generator 460 generates monochrome image data having brightness-gradation characteristics suited to the second liquid crystal display panel 200. The configuration of the second gradation converter 462 is the same as that of the first gradation converter 441 of the first image signal generator 440.

The monochrome image signal sent to the second liquid crystal display panel 200 is delayed, by the calculation of the brightness level, the averaging processing, and the like executed by the second image brightness signal generator 450, with respect to the color image signal sent to the first liquid crystal display panel 100. As such, the display controller 400 includes a non-illustrated synchronization circuit for synchronizing the outputting of the monochrome image signal and the color image signal. Due to this synchronization circuit, the monochrome image corresponding to the color image of the first liquid crystal display panel 100 is displayed on the second liquid crystal display panel 200 and, as such, an appropriate color image is displayed on the liquid crystal display device 10.

The display controller 400 is configured from a central processing unit (CPU), a memory, and the like. In one example, the CPU executes programs stored in the memory to realize the functions of the display controller 400.

As described above, when a response time between the predetermined gradations of the liquid crystal display device 10 is greater than or equal to the predetermined first response time T1, the display controller 400 switches the display of the second liquid crystal display panel 200 for which the response time is long from the monochrome display to the all-white display. As a result, the liquid crystal display device 10 can suppress deteriorations in display quality. Additionally, when a response time between the predetermined gradations of the liquid crystal display device 10 is shorter than the second response time T2, the display controller 400 switches the second liquid crystal display panel 200 from the all-white display to the monochrome display. As a result, the liquid crystal display device 10 can display a color image that has high contrast and high display quality.

Embodiment 2

In Embodiment 1, when a response time between the predetermined gradations of the liquid crystal display device 10 is shorter than the second response time T2, the display controller 400 switches the second liquid crystal display panel 200 from the all-white display to the monochrome display. A configuration is possible in which the response time at which the second liquid crystal display panel 200 is switched from the all-white display to the monochrome display is a response time that is shorter than a third response time T3. The third response time T3 is a response time that is a predetermined amount of time Td shorter than the second response time T2. The other configurations of the liquid crystal display device 10 of the present embodiment are the same as in Embodiment 1 and, as such, the third response time T3 and the amount of time Td are described.

Firstly, the switching of the display of the second liquid crystal display panel 200 in Embodiment 1 is described. The second response time T2 is the response time in a state in which the first liquid crystal display panel 100 displays the color image and the display of the second liquid crystal display panel 200 is the all-white display, in a case in which the display of the second liquid crystal display panel 200 is switched from the monochrome display to the all-white display at the first response time T1. Accordingly, as illustrated in FIG. 5, the temperature of the panel section 50 at which the response time of the liquid crystal display device 10 is the first response time T1 is substantially equivalent to the temperature of the panel section 50 at which the response time of the liquid crystal display device 10 is the second response time T2. In this case, when the temperature of the panel section 50 fluctuates near the temperature at which the response time of the liquid crystal display device 10 is the first response time T1 or the second response time T2, switching of the display of the second liquid crystal display panel 200 may occur frequently. When switching of the display of the second liquid crystal display panel 200 occurs frequently, the observer has difficulty viewing the display.

Therefore, in the present embodiment, the response time at which the second liquid crystal display panel 200 is switched from the all-white display to the monochrome display is set to the third response time T3 that is the predetermined amount of time Td shorter than the second response time T2. The third response time T3 is set on the basis of the dependency on temperature of the response time of the liquid crystal display device 10 in a state in which the display of the second liquid crystal display panel 200 is set to the monochrome display, the dependency on temperature of the response time of the liquid crystal display device 10 in a state in which the display of the second liquid crystal display panel 200 is set to the all-white display, the in-vehicle standard related to display devices, the specifications of the electronic device on which the liquid crystal display device 10 is to be mounted, and the like.

Figure 7:
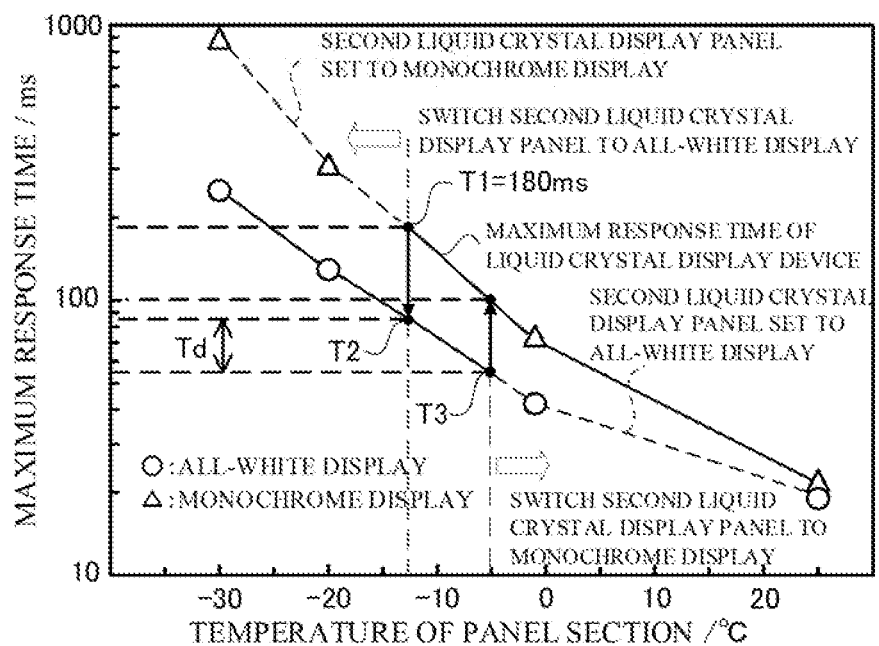
FIG. 7 is a drawing illustrating an example of the dependence on temperature of the maximum response time of a liquid crystal display device according to Embodiment 2.

In the present embodiment, as illustrated in FIG. 7, the third response time T3 is set to a response time (54 ms in FIG. 7) at which the response time of the liquid crystal display device 10 is 100 ms in a case in which the display of the second liquid crystal display panel 200 is switched from the all-white display to the monochrome display at the third response time T3. In this case, the amount of time Td is set to 31 ms (T2−T3=31). That is, in the present embodiment, the display controller 400 switches the second liquid crystal display panel 200 from the all-white display to the monochrome display when the temperature of the panel section 50 increases from the low temperature side (for example −25° C.) due to an increase in the ambient temperature, and the maximum response time of the liquid crystal display device 10 is shorter than the third response time T3 (54 ms). Additionally, as in Embodiment 1, the display controller 400 switches the second liquid crystal display panel 200 from the monochrome display to the all-white display when the temperature of the panel section 50 decreases from 25° C. due to a decrease in the ambient temperature, and the maximum response time of the liquid crystal display device 10 is greater than or equal to the first response time T1 (180 ms).

In the present embodiment, as illustrated in FIG. 7, the temperature of the panel section 50 at which the maximum response time of the liquid crystal display device 10 is the third response time T3 is −5° C., and the temperature at which the maximum response time of the liquid crystal display device 10 is the first response time T1 is −13° C. As such, even when the temperature of the panel section 50 fluctuates near the temperature at which the response time of the liquid crystal display device 10 is the first response time T1 or the third response time T3, the possibility of the display of the second liquid crystal display panel 200 switching frequently is small. Therefore, the liquid crystal display device 10 of the present embodiment can realize stable displaying.

As described above, in the present embodiment, the response time at which the second liquid crystal display panel 200 is switched from the all-white display to the monochrome display is set to the third response time T3 that is the predetermined amount of time Td shorter than the second response time T2. As such, it is possible to suppress the number of time the display of the second liquid crystal display panel 200 is switched, and realize stable displaying of the liquid crystal display device 10. Additionally, as with the liquid crystal display device 10 of Embodiment 1, the liquid crystal display device 10 of the present embodiment can suppress deteriorations in display quality.

Embodiment 3

In Embodiment 1 and Embodiment 2, the liquid crystal display device 10 switches the display of the second liquid crystal display panel 200 directly between the monochrome display and the all-white display. A configuration is possible in which, when switching the display of the second liquid crystal display panel 200 from the monochrome display to the all-white display, between the monochrome display and the all-white display, the liquid crystal display device 10 displays, on the second liquid crystal display panel 200, an image having a gradation between a gradation of the monochrome display and the all-white display, the monochrome display being displayed on the second liquid crystal display panel immediately before switching to the all-white display.

In the present embodiment, when switching the display of the second liquid crystal display panel 200 from the monochrome display to the all-white display, the display controller 400 generates an image (hereinafter referred to as "intermediate gradation image") having a gradation between a monochrome image being displayed on the second liquid crystal display panel 200 immediately before switching to the all-white display and the all-white display. Additionally, the display controller 400 of the present embodiment displays the generated intermediate gradation image on the second liquid crystal display panel 200, between the monochrome display and the all-white display of the second liquid crystal display panel 200. The other configurations of the liquid crystal display device 10 of the present embodiment are the same as in Embodiment 1 or Embodiment 2 and, as such, the intermediate gradation image is described.

At least one intermediate gradation image is generated by the second image signal generator 460 of the display controller 400. When switching the display of the second liquid crystal display panel 200 from the monochrome display to the all-white display, the second image signal generator 460 of the present embodiment generates the intermediate gradation image on the basis of the brightness (gradation) immediately before switching to the all-white display and the brightness (gradation) immediately after switching to the all-white display of each of the main pixels of the liquid crystal display device 10.

Figure 8:
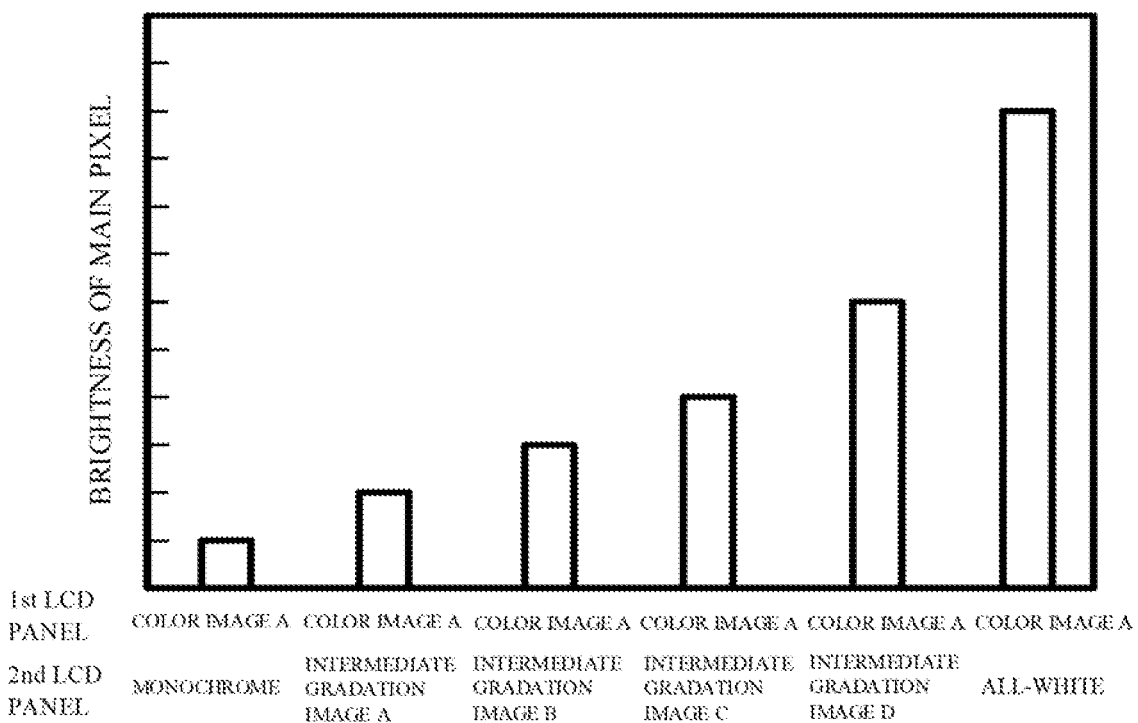
FIG. 8 is a drawing illustrating an example of the relationship between the brightness of the main pixels of a liquid crystal display device, and displays of a first liquid crystal display panel and a second liquid crystal display panel according to Embodiment 3.

FIG. 8 illustrates an example of the relationship between the brightness of the main pixels of the liquid crystal display device 10 and the displays of the first liquid crystal display panel 100 and the second liquid crystal display panel 200. As illustrated in FIG. 8, when comparing the state in which the display of the second liquid crystal display panel 200 is the monochrome display and the state in which the display of the second liquid crystal display panel 200 is the all-white display, the brightness of the main pixels is higher in the state in which the display of the second liquid crystal display panel 200 is the all-white display (except in cases in which the main pixels in the monochrome display are white).

In one example, the second image signal generator 460 of the present embodiment sets the number of intermediate gradation images (in FIG. 8, there are four intermediate gradation images A to D) on the basis of the maximum difference among the differences between the brightnesses of each main pixel immediately before and after switching to the all-white display. Additionally, the second image signal generator 460 of the present embodiment sequentially generates a plurality of intermediate gradation images (the intermediate gradation images A to D) such that the brightness of each main pixel gradually increases. The display controller 400 sequentially outputs signals expressing the generated intermediate gradation images (the intermediate gradation images A to D) to the second liquid crystal display panel 200, between the monochrome display and the all-white display. As a result, when switching the display of the second liquid crystal display panel 200 from the monochrome display to the all-white display, the brightness of the main pixels of the liquid crystal display device 10 increases gradually and, as such, the observer is less likely to feel discomfort due to the switching of the display of the second liquid crystal display panel 200. Note that, it is not necessary to increase the brightness gradually for main pixels in which the difference between the brightnesses of the main pixel immediately before and immediately after switching to the all-white display is small.

As described above, when switching the display of the second liquid crystal display panel 200 from the monochrome display to the all-white display, the liquid crystal display device 10 of the present embodiment displays an image having a gradation between a gradation of the monochrome image being displayed on the second liquid crystal display panel 200 immediately before switching to the all-white display and the all-white display. As such, it is possible to suppress discomfort of the observer caused by the switching of the display of the second liquid crystal display panel 200. Additionally, as with the liquid crystal display device 10 of Embodiment 1, the liquid crystal display device 10 of the present embodiment can suppress deteriorations in display quality.

MODIFIED EXAMPLES

Embodiments have been described, but various modifications can be made to the present disclosure without departing from the spirit and scope of the present disclosure.

For example, in Embodiment 1, the first liquid crystal display panel 100 is implemented as a horizontal electric field type liquid crystal display panel that uses positive liquid crystal and the second liquid crystal display panel 200 is implemented as a horizontal electric field type liquid crystal display panel that uses negative liquid crystal, but the type, liquid crystal, and the like of the first liquid crystal display panel 100 and the second liquid crystal display panel 200 are not limited thereto. A configuration is possible in which the type of the first liquid crystal display panel 100 and the second liquid crystal display panel 200 is a vertical alignment (VA) mode, a twisted nematic (TN) mode, or the like.

A configuration is possible in which the first liquid crystal display panel 100 and the second liquid crystal display panel 200 are implemented as horizontal electric field type liquid crystal display panels that use positive liquid crystal. Since one main pixel of the second liquid crystal display panel 200 corresponds to at least one main pixel of the first liquid crystal display panel 100, the size of a main pixel of the second liquid crystal display panel 200 is the same as the size of a main pixel of the first liquid crystal display panel 100 or multiple times the size of a main pixel of the first liquid crystal display panel 100. When the size of a main pixel of the second liquid crystal display panel 200 is multiple times the size of a main pixel of the first liquid crystal display panel 100, the aperture ratio of the main pixel of the second liquid crystal display panel 200 increases and the degree of freedom related to pixel design increases and, as a result, the transmittance of the second liquid crystal display panel 200 can be further increased. Furthermore, the permittivity in the molecule minor axis direction of the second liquid crystal 230 used in the second liquid crystal display panel 200 is preferably greater, and is more preferably 10% or more greater, than the permittivity in the molecule minor axis direction of the first liquid crystal 130 used in the first liquid crystal display panel 100. As a result, it is possible to suppress rises of the liquid crystal molecules in the second liquid crystal display panel 200 and improve the transmittance of the second liquid crystal display panel 200. The second liquid crystal display panel 200 does not include sub pixels and is not provided with a color filter and, as such, the transmittance of the main pixels is easier to improve. Moreover, by increasing the permittivity in the molecule minor axis direction of the second liquid crystal 230 and improving the transmittance of the second liquid crystal display panel 200, it is possible to more effectively improve the transmittance of the first liquid crystal display panel 100.

Figure 9:
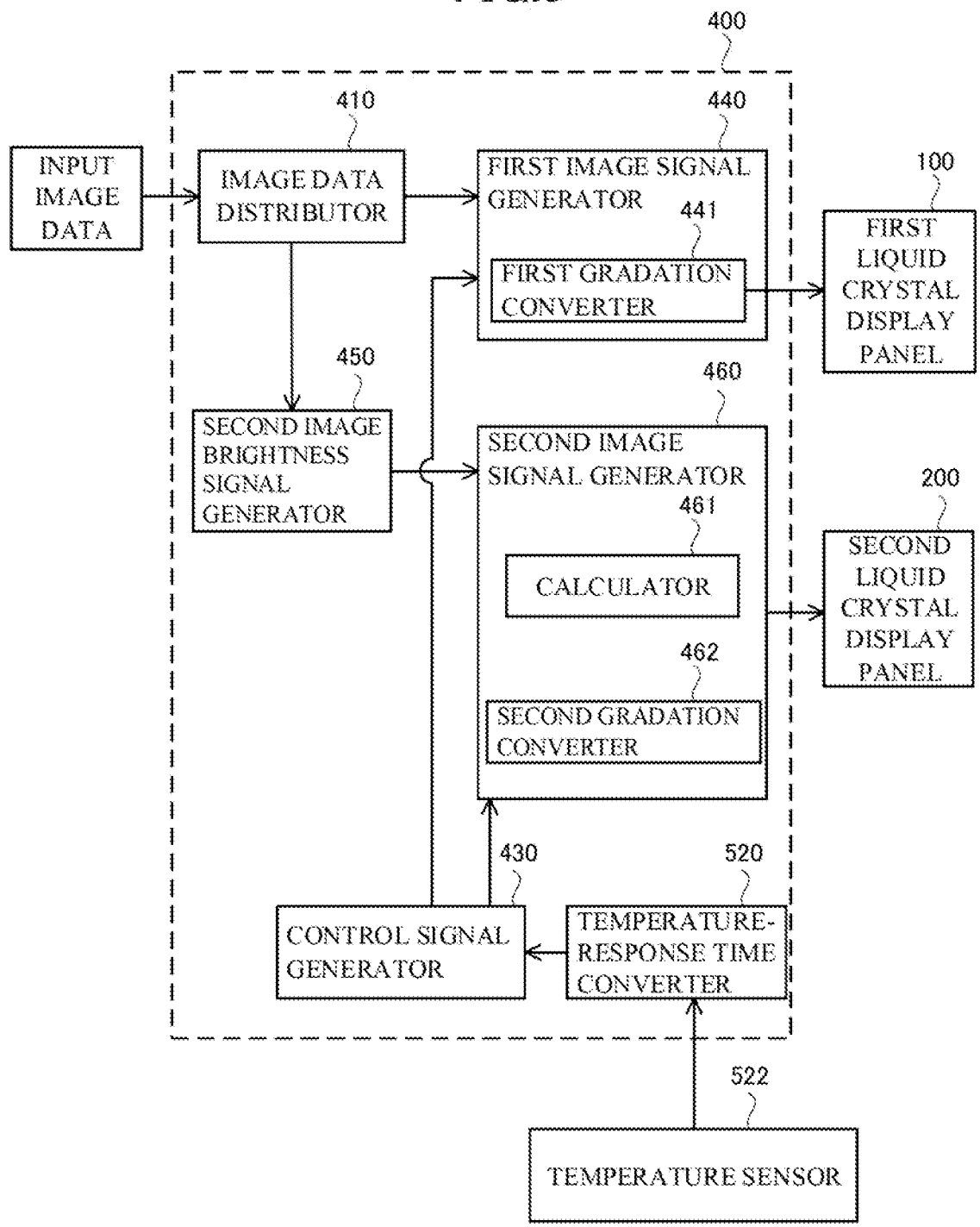
FIG. 9 is a block diagram illustrating the configuration of a display controller according to a modified example.

In Embodiment 1, the response time measurer 420 calculates the response time between predetermined gradations from changes in the light amount of the liquid crystal display device 10 measured by the photosensor 422. As illustrated in FIG. 9, a configuration is possible in which the display controller 400 includes a temperature-response time converter 520 instead of the response time measurer 420, and the temperature-response time converter 520 calculates the response time between predetermined gradations from a temperature measured by a temperature sensor 522 provided in the panel section 50. In such a case, the temperature-response time converter 520 calculates the response time between predetermined gradations from the temperature measured by the temperature sensor 522, and the relationship between the temperature of the panel section 50 and the response time between predetermined gradations. The relationship between the temperature of the panel section 50 and the response time between predetermined gradations is measured in advance.

A configuration is possible in which the panel section 50 of the liquid crystal display device 10 of Embodiments 1 to 3 includes a heating heater. With such a configuration, even when the ambient temperature decreases, it is possible to suppress lengthening of the response time of the liquid crystal display device 10, and further suppress deteriorations in display quality of the liquid crystal display device 10.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A liquid crystal display device, comprising:
   a first liquid crystal display panel that displays a color image;
   a second liquid crystal display panel that is positioned on a side, opposite a surface of an observer side, of the first liquid crystal display panel so as to overlap the first liquid crystal display panel, and that displays a monochrome image; and
   a display controller that controls a display of the first liquid crystal display panel and a display of the second liquid crystal display panel, and that switches the display of the second liquid crystal display panel between the monochrome image and an all-white image, wherein
   a response time of the second liquid crystal display panel is longer than a response time of the first liquid crystal display panel, and
   in a state in which the second liquid crystal display panel is displaying the monochrome image, when a response time between predetermined gradations is greater than or equal to a predetermined first response time, the display controller switches the display of the second liquid crystal display panel from the monochrome image to the all-white image.

2. The liquid crystal display device according to claim 1, wherein when a response time between the predetermined gradations is shorter than a second response time in a state in which the second liquid crystal display panel displays the all-white image, the second response time being a response time between the predetermined gradations in a state in which, when the second liquid crystal display panel is switched to display the all-white image at the first response time, the display of the second liquid crystal display panel is the all-white image,
   the display controller switches the display of the second liquid crystal display panel from the all-white image to the monochrome image.

3. The liquid crystal display device according to claim 2, wherein in the state in which the display of the second liquid crystal display panel is the all-white image, when a response time between the predetermined gradations is shorter than a third response time that is a predetermined amount of time shorter than the second response time,
   the display controller switches the display of the second liquid crystal display panel from the all-white image to the monochrome image.

4. The liquid crystal display device according to claim 1, wherein when the display of the second liquid crystal display panel is the all-white image, the display controller performs gamma correction on a color image signal to be input into the first liquid crystal display panel.

5. The liquid crystal display device according to claim 4, wherein the gamma correction matches first gamma characteristics in a state in which the display of the second liquid crystal display panel is the monochrome image to second gamma characteristics in a state in which the display of the second liquid crystal display panel is the all-white image.

6. The liquid crystal display device according to claim 1, wherein when switching the display of the second liquid crystal display panel from the monochrome image to the all-white image, between the monochrome image and the all-white image, the display controller displays, on the second liquid crystal display panel, an image having a gradation between a gradation of the monochrome image being displayed on the second liquid crystal display panel immediately before switching to the all-white image and the all-white image.

7. The liquid crystal display device according to claim 1, wherein
   the first liquid crystal display panel and the second liquid crystal display panel are horizontal electric field type liquid crystal display panels,
   the first liquid crystal display panel includes a positive first liquid crystal,
   the second liquid crystal display panel includes a positive second liquid crystal, and
   permittivity in a molecule minor axis direction of the second liquid crystal is greater than permittivity in a molecule minor axis direction of the first liquid crystal.

* * * * *